Nov. 28, 1961  B. B. RAPPAPORT  3,010,385
MEAT ROASTING SPIT ARRANGEMENT
Filed Dec. 7, 1953  2 Sheets—Sheet 2
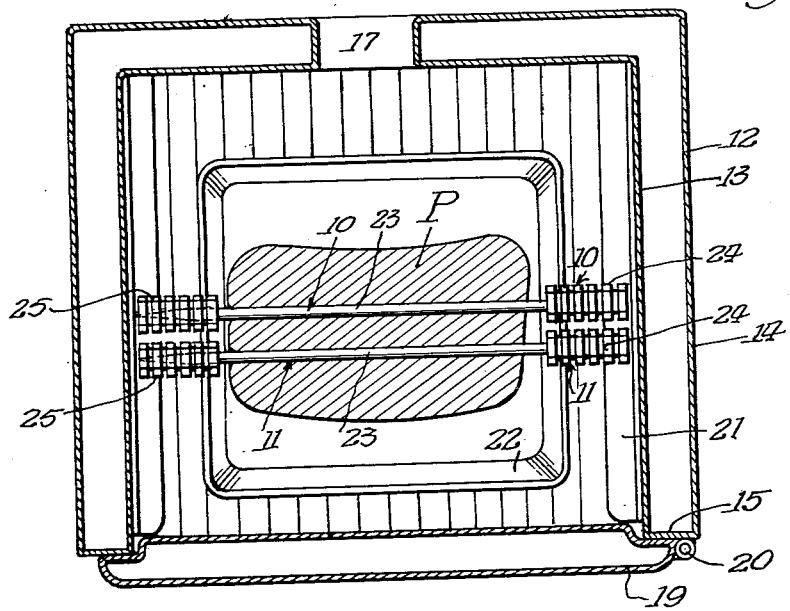
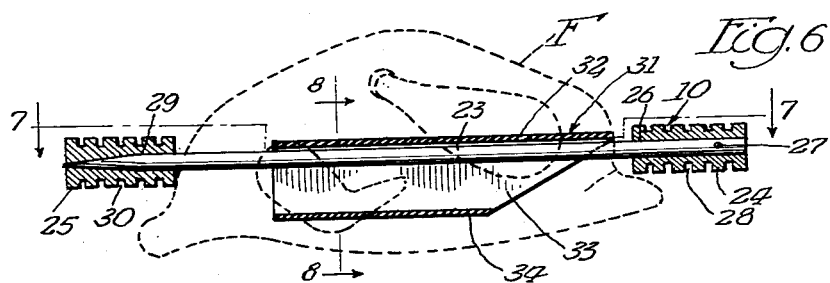
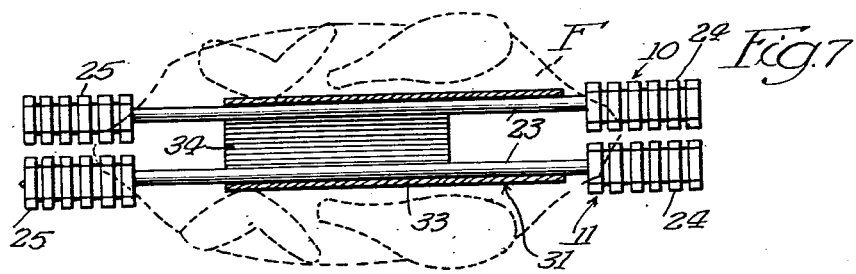
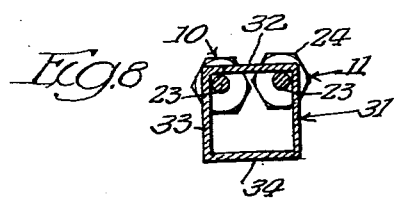
INVENTOR.
Bernard B. Rappaport

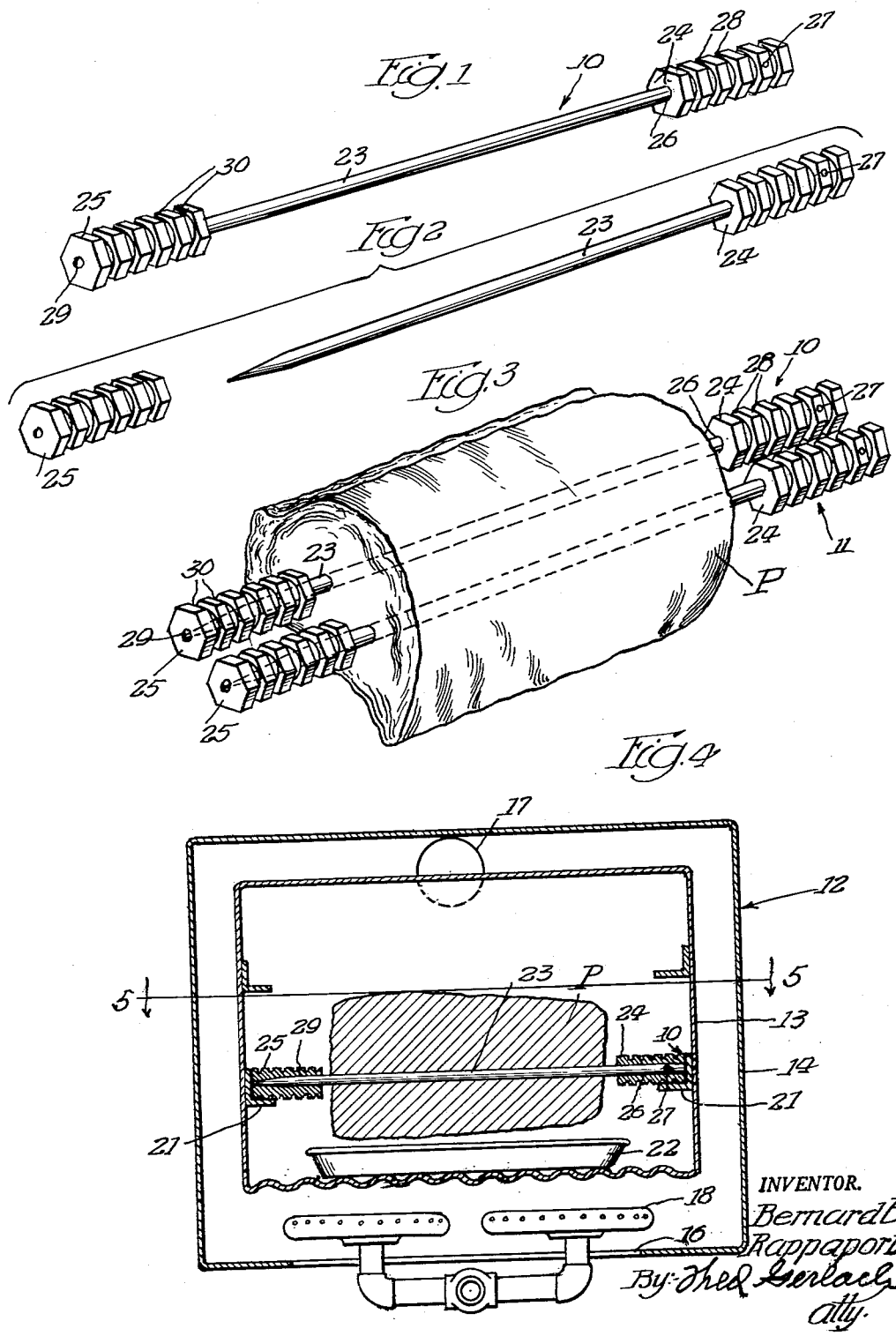

United States Patent Office 3,010,385
Patented Nov. 28, 1961

3,010,385
MEAT ROASTING SPIT ARRANGEMENT
Bernard B. Rappaport, 55 E. Washington St., Chicago, Ill.
Filed Dec. 7, 1953, Ser. No. 396,690
3 Claims. (Cl. 99—421)

The present invention relates generally to spit. More particularly the invention relates to that type of spit which is adapted for use in connection with the roasting of meat, is in the form of a metallic rod having a blunt end and a pointed end, is designed to be inserted through the meat to be roasted, and serves as a medium or instrumentality for supporting the meat in proper position in the roasting oven of a conventional gas or electric stove.

One object of the invention is to provide a spit which is an improvement upon and possesses greater efficiency than, previously designed spits of the type under consideration and is so designed and constructed that when used it materially reduces the roasting time of the meat being roasted and hence lessens shrinkage of the meat.

Another object of the invention is to provide a spit which is formed of aluminum or like metal having a high degree of heat conductivity, is adapted to span two horizontally aligned and oppositely disposed rack supporting rails on the inner side walls of the roasting oven in which the spit is used or employed, and has on the ends thereof sleeves which are formed of the same metal as the spit, are adapted to rest on, and be supported by, the two rails and serve to conduct heat from the inner side walls of the oven and also the two rails to the spit to the end that the spit heats the interior of the meat being roasted while the exterior of the meat is being heated by the hot air in the oven.

Another object of the invention is to provide a spit of the last mentioned character in which the sleeve on the blunt end of the spit is fixedly secured in place in order that it serves not only as a supporting and heat transfer medium for the spit but also as a handle whereby the spit may be readily inserted through the meat to be roasted and removed from the roasted meat, and the sleeve for the pointed end of the spit is loosely mounted in order that it may be removed before the spit is inserted through the meat to be roasted and also after the meat is roasted.

Another object of the invention is to provide a spit of the type and character under consideration in which the sleeves are polygonal in cross section in order that when the spit is in its operative position they will not roll on the rails on which they are supported, and have in their outer surfaces a plurality of continuous equidistantly spaced grooves which serve so to increase the outer surface areas of the sleeves that the sleeves possess a high degree of heat absorption.

A further object of the invention is the provision of a specially constructed member which is adapted to be mounted on the central portions of a pair of spits of the aforementioned character and is designed for disposition in the eviscerated cavity of a fowl, such as a chicken or turkey to the end that the spits may be used effectively and efficiently in connection with roasting of fowl.

A still further object of the invention is to provide a meat roasting spit which is generally of new and improved construction, effectively and efficiently fulfills its intended purpose and is so designed and constructed that it may be produced at a comparatively low cost and also handled or employed with facility.

Other objects of the invention and the various advantages and characteristics of the present spit will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

FIGURE 1 is a perspective view showing a meat roasting spit embodying the invention with the removable sleeve in place on its pointed end;

FIGURE 2 is a perspective view showing the spit of FIGURE 1 with the removable sleeve in separated relation with the pointed end of the spit;

FIGURE 3 is a perspective view showing two spits embodying the invention after being applied to a piece of meat to be roasted;

FIGURE 4 is a vertical section of the roasting oven of a stove, illustrating the two spits of FIGURE 3 in place on two horizontally aligned and oppositely disposed rack supporting rails on the inner side walls of the roasting oven;

FIGURE 5 is a horizontal section taken on the line 5—5 of FIGURE 4 and showing in detail the manner in which the two spits serve to support the piece of meat within the roasting oven;

FIGURE 6 is a longitudinal section showing a pair of spits having mounted on the central portions thereof a tubular adaptor type member and illustrating the manner in which the adaptor permits the spits to be used in connection with roasting of a fowl; and FIGURES 7 and 8 are horizontal and transverse sections taken respectively on the lines 7—7 and 8—8 of FIGURE 6.

The spit which is shown in FIGURES 1 and 2 of the drawings constitutes the preferred form or embodiment of the invention. It is designated by the reference numeral 10 and serves with a similar spit 11 as a medium or instrumentality for supporting a piece P of meat in proper position in a roasting oven 12 of a conventional stove in connection with roasting of the piece. The roasting oven 12 comprises an open front inner shell 13 and an open front outer shell 14 and is so constructed or arranged that the two shells are in spaced apart relation as well understood in the art. Each of the two shells consists of a horizontally extending bottom wall, a pair of vertically extending spaced apart side walls, a vertically extending back wall and a horizontally extending top wall. A front wall 15 in the form of a rectangular frame is connected to, and extends between, the front edges of the bottom, side and top walls of the inner and outer shells 13 and 14 and serves to close the front portion of the space between the two shells. The bottom wall of the outer shell has an air inlet opening 16 and the upper central portion of the back wall of the outer shell has an air outlet opening 17. Disposed between the bottom walls of the two shells are burners 18. When the burners are in operation in connection with a roasting operation they serve to heat the air that enters the space between the two shells via the air inlet opening 16. The heated air flows upwards around the inner shell and then is exhausted via the air outlet opening 17. The heated air that flows upwards around the inner shell heats such shell in order to effect roasting of any meat product or like article in the interior of the inner shell. The open front of the inner shell is closed by way of a hollow door 19 which is supported by hinges 20 in order that it may be swung into an open position when access to the interior of the shell 13 is desired. On the inner surfaces of the side walls of the inner shell are two horizontally aligned and oppositely disposed rails 21 providing upwardly facing ledges for supporting a conventional rack (not shown). The rails may be of any suitable form although they are shown in the drawing as being formed of angle bar stock. It is contemplated that in connection with a roasting operation a pan 22 will be placed on the bottom wall of the inner shell in order to catch drippings.

The spit 10 is adapted to span and be supported on the rails 21 as shown in FIGURE 4 and comprises a comparatively thick rigid rod 23 and a pair of rigid sleeves 24 and 25. The over-all length of the spit corresponds to the distance between the rails 21. The rod 23 is formed of aluminum or like metal having a high degree of heat conductivity and has one end thereof blunt and its other end pointed. The pointed end permits the rod in connection with use of the spit 10 to be inserted lengthwise through the piece P of meat. The rod 23 is circular in cross section and except for its pointed end is of uniform diameter throughout. In practice it has been found that most satisfactory results are obtained when the rod is formed of aluminum stock that is approximately ⅜ of an inch in diameter. The sleeve 24 extends around the blunt end of the rod 23 and is formed of aluminum or any like metal having a high degree of heat conductivity. Preferably the sleeve is formed of the same metal as the rod, i.e., aluminum. The interior of the sleeve 24 is in the form of an open ended bore 26, the diameter of which is substantially the same as the diameter of the rod 23. A transversely disposed pin 27 extends through aligned holes in the sleeve 24 and the blunt end of the rod 23 and serves to hold the sleeve in fixed relation with the blunt end of the rod. Preferably the sleeve 24 is arranged so that its outer end surface is flush with the end surface of the blunt end of the rod. The outer portion of the sleeve 24 is adapted when the spit is in use to rest on one of the rails 21, as shown in FIGURE 4. The sleeve 24 has a threefold purpose. In the first place it serves as a medium or instrumentality for supporting the blunt end of the rod 23 on one of the rails 21. Secondly, it functions as a heat transfer medium whereby heat from the rail and the adjacent inner side wall of the inner shell of the oven is transferred or conducted to the rod 23 to the end that the rod in connection with use of the spit effects heating of the interior of the piece P of meat. Thirdly, the sleeve 24 functions as a handle in connection with insertion and removal of the rod 23 with respect to the piece of meat. The sleeve 24 is polygonal in cross section in order that when it is in place on the rail to which it is applied it will not roll. The outer side surface of the sleeve 24 is provided with a series of continuous transversely disposed grooves 28. These grooves are preferably spaced equidistantly apart and serve so to increase the outer surface area of the sleeve 24 that the sleeve possesses an extremely high degree of heat absorption.

The sleeve 25 is in the form of an end cap which is removably mounted on the pointed end of the rod 23 and for all intents and purposes is the same in external configuration and design as the sleeve 24 around the blunt end of the rod. It is formed of aluminum or like metal having a high degree of heat conductivity and embodies a longitudinal bore 29. The later is shaped conformably to, and is adapted to receive and frictionally grip, the pointed end of the rod 23. In connection with use of the spit 10 the outer end portion of the sleeve 25 is adapted to rest on the other rail 21 of the roasting oven. The sleeve 25 has a twofold purpose in that it serves not only as a supporting medium for the pointed end of the rod 23 but also as an instrumentality for conducting or transferring heat from the rail on which it is supported to the rod. The sleeve 25 is polygonal in cross section and embodies in its outer side surface a series of continuous equidistantly spaced circumferentially extending grooves 30 which serve to increase the outer surface area of the sleeve. It is contemplated that the sleeve will be removed from the pointed end of the rod when the rod is inserted through the piece P of meat and also when the rod is removed after roasting of the piece.

The spit 11 is generally used in connection with the spit 10. It is exactly the same in design and construction as the spit 10 and comprises a rod 23, a fixed sleeve 24 on the blunt end of the rod 23 and a removable sleeve 25 on the pointed end of the rod.

When it is desired to use the spits 10 and 11 in connection with roasting of the piece P of meat the sleeves 25 are first removed from the pointed ends of the rods 23 of the spits. Thereafter the rods are inserted lengthwise through the piece. Insertion of the rods through the piece of meat is effected by using the sleeves 24 as handles. It is contemplated that the rods of the two spits will be inserted through the piece of meat so that they are spaced a small distance apart and are in parallel relation. After the piece of meat is impaled on the central portions of the rods 23 the sleeves 25 are applied to the pointed ends of the rods. After the sleeves 25 are properly mounted in place the two spits 10 and 11 with the piece of meat thereon are placed in the interior of the inner shell of the roasting oven 12 and are manipulated so that the outer end portions of the sleeves 24 rest on one of the rails 21 and the outer end portions of the sleeves 25 rest on the other rail. In connection with a roasting operation the sleeves 24 and 25 absorb heat from the rails 21 and the side walls of the inner shell of the oven and transfer the absorbed heat to the rods 23 which, in turn, transfer the heat to the interior of the piece P of meat. By heating the interior of the meat at the same time that the exterior of the meat is being roasted the time of roasting of the piece of meat is materially reduced and shrinkage is correspondingly reduced. The two spits 10 and 11 serve not only materially to reduce the roasting time and the shrinkage of the piece of meat but also effect a substantially uniform cooking or roasting of the piece. The purpose of employing the two spits is to prevent the piece of meat from turning during a roasting operation. It is contemplated, however, that in certain instances but a single spit may be employed. If two spits are employed so as to prevent the piece of meat being roasted from turning it is contemplated that the fatty portion of the meat will be positioned on top so that in connection with roasting the fat will flow downwards through the meat for flavoring and other purposes. In connection with a roasting operation the drippings from the piece of meat are caught in the pan 22 on the bottom wall of the inner shell 13 of the oven 12. At the conclusion of a roasting operation the roasted piece of meat together with the two spits is removed from the oven. Thereafter the sleeves 25 are removed from the pointed ends of the rods 23 and the rods are withdrawn by pulling on the handle forming sleeves 24.

When it is desired to use the spits 10 and 11 in connection with roasting of a fowl F an adaptor type member 31 is employed. The latter is shown in FIGURES 6, 7 and 8 of the drawings and is tubular in design or construction. It is adapted to surround the central portions of the rods of the spits 10 and 11 and to be disposed within and lengthwise of the eviscerated cavity in the fowl F. The member 31 is formed of aluminum or any similar metal having a high degree of heat conductivity and consists of a top wall 32, a pair of oppositely disposed side walls 33 and a bottom wall 34. The side walls extend between, and are connected to, the side margins of the top and bottom walls. The ends of the member 32 are open in order that the member may be mounted on the rods 23 of the spits 10 and 11 and also readily removed from the eviscerated cavity of the fowl F even though such cavity is filled or charged with stuffing while the fowl is being roasted on the two spits. In connection with use of the member 31 the top wall 32 rests on the central portions of the rods of the spits.

When it is desired to use the spits 10 and 11 in connection with roasting of a fowl, such as a turkey or chicken, the tubular adaptor type member 31 is inserted lengthwise into the eviscerated cavity in the fowl. Thereafter the cavity filled with stuffing. After filling of the cavity with stuffing the sleeves 25 are removed from the pointed ends of the rods 23. Thereafter the pointed ends of the rods are aligned with the outer end of the member 31 and the rods are then pushed forward so as to cause them to pass through the member and also the neck portion of the fowl. After the rods and the two spits are properly inserted into place the sleeves 25 are re-applied to the pointed ends of the rods and the two spits with the fowl mounted thereon are placed in the roasting oven. At the end of the roasting period the roasted fowl is removed from the oven and then the sleeves 25 are removed from the pointed ends of the rods of the spits. After removal of the sleeves 25 the rods are pulled out of the fowl and then the tubular member 31 is removed from the fowl interior by sliding it lengthwise through the opening that leads to the eviscerated cavity in the fowl. In connection with a fowl roasting operation the two spits and the tubular adaptor type member 31 serve internally to heat the fowl to the end that the time of roasting and shrinkage are reduced.

The herein described spit arrangement consisting of one or both spits effectively and efficiently fulfills its intended purpose and may be produced at a comparatively low cost. It may be handled with facility and results in the meat that is roasted thereon being roasted uniformly and in a comparatively short time.

The invention is not to be understood as restricted to the details set forth since these may be modified within the scope of the appended claims without departing from the spirit and scope of the invention.

Having thus described the invention what I claim as new and desire to secure by Letters Patent is:

1. The combination with a roasting oven having vertically disposed side walls provided with side rails defining a pair of flat upwardly facing supporting ledges on opposite sides of the oven chamber, said ledges being disposed within the oven chamber at substantially the same elevation, of a spit designed for use in connection with the roasting of a piece of meat within the oven chamber and comprising an elongated straight cylindrical rod formed of a metal possessing a high degree of heat conductivity and having a conical distal end for piercing and insertion through the piece of meat, the proximate end of the rod being blunt, an elongated combined handle and heat collecting sleeve of comparatively large size formed of a metal possessing a high degree of heat conductivity and having an axial cylindrical bore therethrough into which the proximate end region of said rod fits snugly in heat-exchange relationship coextensively throughout the bore, means fixedly securing said blunt end region of the rod within said bore with the blunt end proper terminating flush with the proximate end face of the sleeve, and an end cap telescopically and removably mounted on said distal end of the rod, said end cap presenting an exterior configuration conforming in size and shape to that of said handle and heat-collecting sleeve and being formed of a like metal, said end cap being formed with an axial socket-like bore therethrough including a proximate cylindrical portion and a frusto-conical distal portion conforming in slant angle to the slant angle of said conical distal end of the rod and of slightly less slant height than the slat height of the conical distal end of the rod, said distal end region of the rod fitting snugly within said socket-like bore in the end cap in heat exchange relationship coextensively throughout the bore, said spit bridging the distance between said supporting ledges with said end cap having its outer side resting by gravity on one of said supporting ledges, with said combined handle and heat-collecting sleeve resting by gravity on the other supporting ledge and with the rod projecting transversely across the oven chamber.

2. The combination set forth in claim 1 wherein said combined handle and heat collecting sleeve, as well as said end cap, are each polygonal in transverse cross section and have flat sides for the stable support on said flat supporting ledges, said combined handle and heat collecting sleeve and said end cap each being formed with a series of axially spaced, circumferentially extending annular grooves therearound for enhancing the heat collecting properties of the sleeve and cap.

3. The combination with a roasting oven having vertically disposed side walls provided with side rails defining a pair of upwardly facing flat supporting ledges on opposite sides of the oven chamber, said ledges being disposed within the oven chamber at substantially the same elevation, of a spit assembly for use in connection with the roasting of a fowl within the oven chamber and comprising a tubular normally horizontal member having a flat horizontal upper wall adapted to fit lengthwise within the eviscerated cavity of the fowl, a pair of straight cylindrical rods extending normally in spaced parallelism through said tubular with said flat horizontal upper wall resting by gravity on the upper sides of said parallel rods, each rod having a conical distal end for piercing and insertion through the fowl and tubular member and having a blunt proximate end, an elongated combined handle and heat-collecting sleeve of comparatively large size for each rod, said handle and sleeve having an axial cylindrical bore therethrough into which the proximate end of its respective rod fits snugly in heat-exchange relationship coextensively throughout the bore, means fixedly securing said blunt end region of each rod within the bore of its respective sleeve, and an end cap for each rod, said end cap being telescopically and removably mounted on the distal end of its respective rod, said end cap presenting an exterior configuration conforming in size and shape to that of the handle and sleeve, said end cap being formed with an axial socket-like bore therethrough including a proximate cylindrical portion and a frusto-conical distal portion conforming in slant angle to the slant angle of the conical distal end of its respective rod, the distal end region of the rod fitting snugly within the socket-like bore in the end cap in heat exchange relationship coextensively through the bore, said spit, as a whole, bridging the distance between said supporting ledges with said end caps having their outer sides resting by gravity on one of said ledges and with said combined handles and heat collecting sleeves resting by gravity on the other supporting ledge, said rods, sleeves and end caps being formed of a metal having high heat conductivity, each of said sleeves and end caps being of polygonal cross section and having flat sides for stable support of the sleeves and end caps on said ledges, each sleeve and end cap being formed with a series of axially spaced continuous annular grooves therearound to enhance the heat collecting properties thereof.

References Cited in the file of this patent
UNITED STATES PATENTS

| 1,485,253 | Devlin | Feb. 26, 1924 |
| 1,896,580 | Gilmore | Feb. 7, 1933 |
| 1,964,372 | Tygart | June 26, 1934 |
| 2,262,910 | Aller | Nov. 18, 1941 |
| 2,390,309 | Keys | Dec. 4, 1945 |
| 2,651,251 | Brown | Sept. 8, 1953 |

FOREIGN PATENTS

| 3,990 | Great Britain | Mar. 22, 1886 |
| 478,044 | Great Britain | Jan. 11, 1938 |
| 657,089 | Germany | Feb. 24, 1938 |